Patented Sept. 2, 1952

2,609,287

UNITED STATES PATENT OFFICE 2,609,287

FERTILIZERS

Karl Heinz Hennenberger, Albersbach-on-the-Odenwald, Germany, assignor to Huttenchemie G. m. b. H., Mannheim-Rheinau, Germany, a limited liability company of Germany No Drawing. Application September 17, 1951, Serial No. 247,025. In Germany February 6, 1951

4 Claims. (Cl. 71—45)

This invention relates to fertilizers and more especially to a fertilizer containing besides phosphoric acid, also substantial proportions of manganese.

It is an object of this invention to provide a manganese containing fertilizer of higher efficiency than similar fertilizers hitherto known.

In the course of the last decade it has been found that the soil frequently shows a decided deficiency of manganese and that plants growing in such a soil are exposed to the so-called dry-spot disease. This particular phenomenon has been found in particularly great strength in oats and beans, however all other plants also suffer under a deficiency of manganese which leads to special deficiency phenomena and poor yield.

By fertilizing the soil with manganese sulphate or mixtures containing this salt the disease could be fought successfully, but it was found that these readily soluble manganese compounds have only a short life and action, because they are either quickly washed out or bound and rendered inactive in the soil.

The manganese contained in Thomas phosphate to some extent alleviated a deficiency of manganese in the soil, however the comparatively small and little efficient content of manganese in Thomas phosphate could not lead to a fully satisfactory removal of these defects.

While it is known to produce fertilizers containing phosphoric acid by decomposing crude phosphates in the presence of materials containing an alkali and silica, for instance soda and sand by calcination or in the presence of the slag resulting in the desulphurizing of pig iron with soda in a smelting process, the fertilizers obtained in this manner do not contain any percentage of manganese worth speaking of.

It has therefore been suggested to add to the mixture of crude phosphates with materials containing alkali and silica, which were to be calcined or smelted down, substances containing manganese, for instance manganese ores and slags or manganese-containing residual matter. These added materials contain manganese in a form in which it dissolves only with difficulty and therefore their action is a more lasting one. In the process of calcination or smelting the manganese-containing material is decomposed largely and there results a compound of manganese containing an alkali and calcium which is soluble almost entirely in a slightly acid liquid such as for instance a 2 percent citric acid. The particular effect of this manganese fertilizer is based on this readily solubility in slightly acid soils.

It has however been found that an oxidation of the manganese such as occurs when decomposing crude phosphate in an oxidizing or in a neutral atmosphere, leads to disturbances in the decomposition.

According to the present invention, therefore, decomposition of the crude phosphate mixed with a manganese-containing material is effected in a reducing atmosphere.

It has been found by experiment that in a reducing atmosphere in the furnace decomposition occurs far more quickly and better than according to the way hitherto followed and that greater yields per unit of time can be obtained than with the process conducted in an oxidizing or a neutral atmosphere.

It has further been found that manganese, if subjected to the reducing treatment, has a better fertilizing effect. It is also possible, when operating in a reducing atmosphere, to operate at lower temperatures because lower oxygen compounds of manganese have lower softening points.

Another advantage of the treatment suggested according to this invention consists therein that in the fertilizer thus obtained the manganese is present in a different physiological form, viz. as a lower oxide. Tests have shown that the higher oxides of manganese in the form of alkali compounds sooner or later are reduced to lower oxides by the action of the soil bacteria. However, since by producing the fertilizer in a reducing atmosphere the manganese contained therein has the form of lower oxides, one saves at least the period of time which would be required for the manganese to be reduced in the soil and therefore in the new fertilizer obtained according to this invention the manganese will have a quicker action.

A reducing atmosphere can be produced in the furnace by adding $H_2$ and $CO$ in excess, but it may also be produced for instance by adding to the mixture of minerals fine small duff or, in the case of a smelting down decomposition, by blowing coal dust or oil into the molten mass.

In the operation of my invention I prefer to proceed for instance as follows:

*Example 1.*—A mixture of 100 parts by weight Constantine phosphate, 18 parts soda, 12 parts sand, 10 parts manganese ore containing 38% Mn and 2 parts fine small coal was heated to calcination at a temperature of 1150° C. while preventing the entrance of oxygen in excess.

The product obtained showed a content of 4.1% Mn and 23.5% $P_2O_5$ soluble in ammonium citrate.

*Example 2.*—A mixture of 100 parts pebble phosphate, 85 parts soda slag and 8 parts manganese slag containing 28% Mn was smelted down at a temperature of 1250° C. Into the molten mass was forced a quantity of ordinary fuel oil such that throughout the furnace a reducing atmosphere was maintained.

The product obtained in this operation contained 6.2% Mn and 19.2% $P_2O_5$ soluble in citric acid.

Fertilizing tests made with the products obtained according to this invention showed that the new fertilizer possessed a particularly great and lasting efficiency and that the dry spot disease was done away with altogether.

Various changes may be made in the proportions of the materials used in the process as well as in the conditions under which the process is performed, without departing from the invention or sacrificing the advantages thereof.

I claim:

1. The process of producing a fertilizer which comprises heat-treating in a reducing atmosphere at a temperature leading at least to calcination, a mixture of crude phosphate with a material containing a substantial percentage of manganese and a material containing an alkali and silica.

2. The process of claim 1, in which the reducing atmosphere is produced by an addition of coal fines to the mixture.

3. The process of claim 1, in which the reducing atmosphere is produced by forcing fuel oil into the molten mixture.

4. The process of claim 1, in which the starting mixture is heated to a temperature above 1000° C.

KARL HEINZ HENNENBERGER.

No references cited.